No. 875,522.
PATENTED DEC. 31, 1907.
L. F. HAYNES.
BEET BLOCKER.
APPLICATION FILED JUNE 1, 1907.
2 SHEETS—SHEET 1.
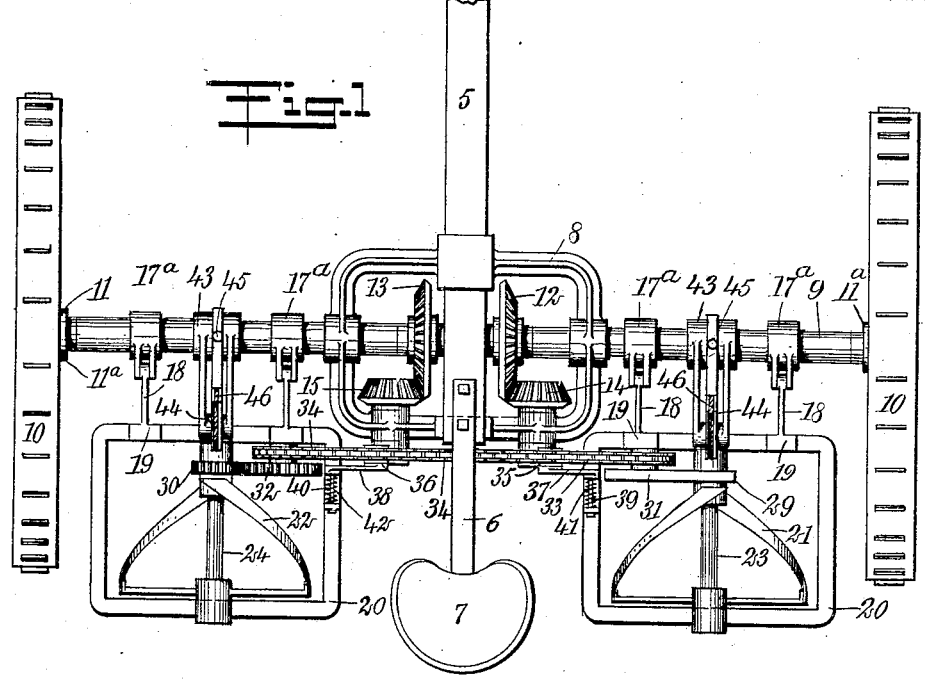
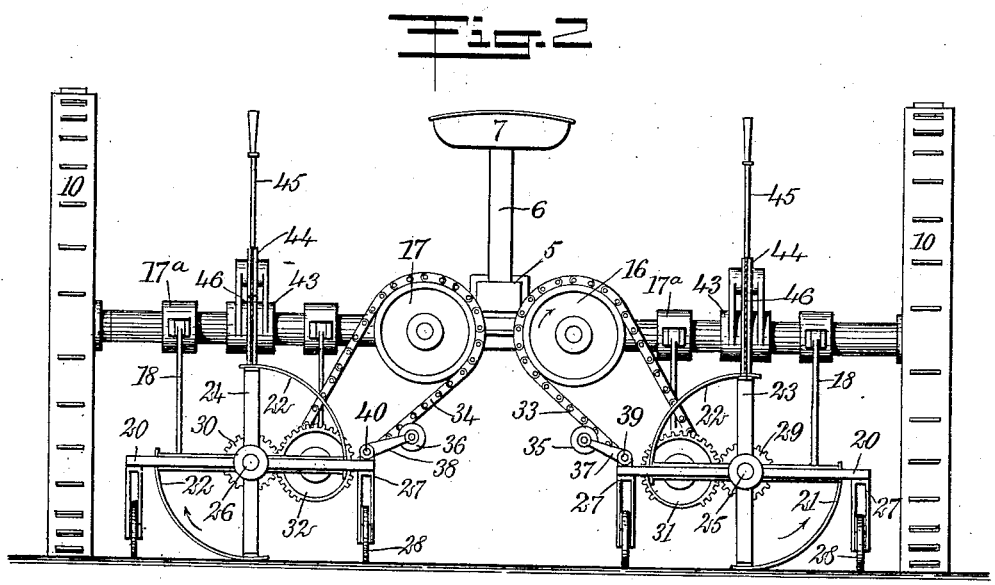
WITNESSES
F. D. Sweet.
Walton Harrison.
INVENTOR
Lewis F. Haynes
BY Munn & Co.
ATTORNEYS No. 875,522. PATENTED DEC. 31, 1907.
L. F. HAYNES.
BEET BLOCKER.
APPLICATION FILED JUNE 1, 1907.
2 SHEETS—SHEET 2.
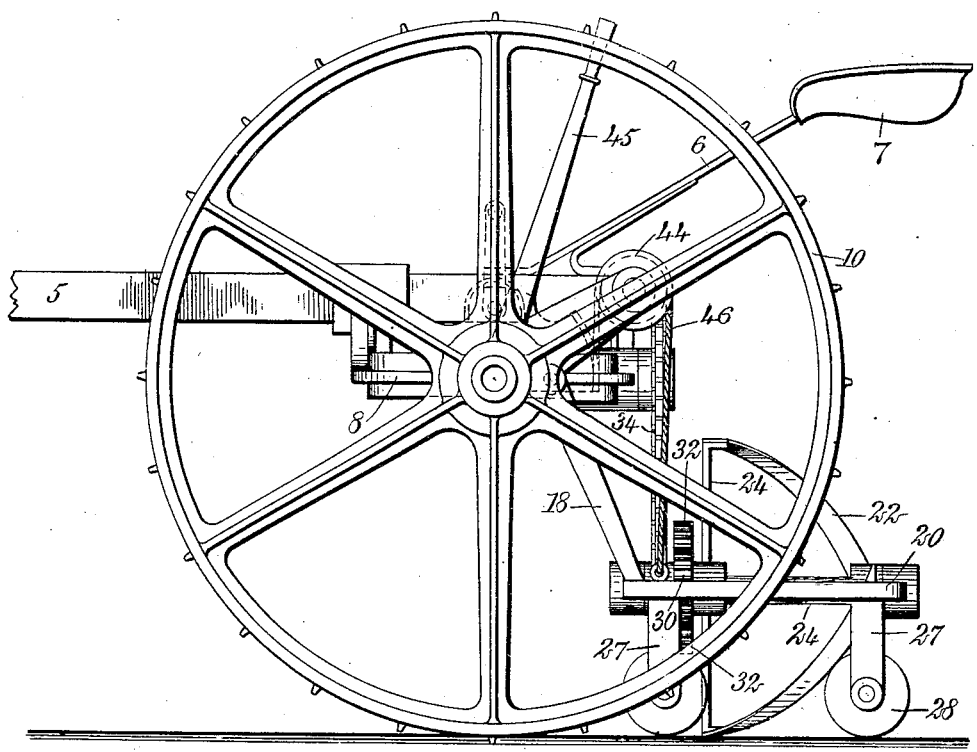
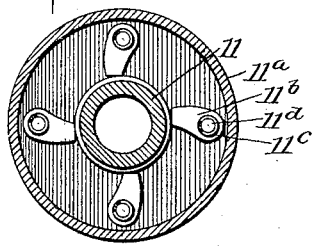
WITNESSES
INVENTOR
Lewis F. Haynes
BY Munn&Co.
ATTORNEYS

UNITED STATES PATENT OFFICE.

LEWIS FAY HAYNES, OF BRANT, MICHIGAN.

BEET-BLOCKER.

No. 875,522.  Specification of Letters Patent.  Patented Dec. 31, 1907.

Application filed June 1, 1907. Serial No. 376,822.

*To all whom it may concern:*

Be it known that I, LEWIS F. HAYNES, a citizen of the United States, and a resident of Brant, in the county of Saginaw and State of Michigan, have invented a new and Improved Beet-Blocker, of which the following is a full, clear, and exact description.

My invention relates to agricultural machines, and more particularly to a type of machine to be dragged along the ground by animals, and provided with cutting mechanism, and thus being adapted for beet blocking.

Reference is to be had to the accompanying drawings forming a part of this specification, in which similar characters of reference indicate corresponding parts in all the figures.

Figure 1 is a plan view of the essential portions of the machine, this view showing the carriages dragged along by the main framework and the gearing for actuating the cutting mechanism carried by these carriages; Fig. 2 is a rear elevation showing more particularly the sprocket gearing for actuating the cutters, and showing further the hand-levers for raising and lowering the carriages; Fig. 3 is an enlarged fragmentary side elevation showing the connections between the carriages and the framework, and also showing the distribution of various sprocket gears and chains for propelling the cutters; and Fig. 4 is an enlarged sectional detail view upon the line 4—4 of Fig. 2, looking in the direction of the arrows, and showing the pawl mechanism for turning the tubular main shaft.

A tongue is shown at 5, and extending obliquely and backwardly from it is a spring support 6 carrying a seat 7. A bracket 8 is connected with the tongue and with the supporting tubes 9, so as to connect these parts rigidly together. The tread wheels are shown at 10 and are rotated by engagement with the ground as the machine is dragged along. A main shaft is shown at 11 and is turned by aid of clutch mechanism shown in Fig. 4, through the agency of the tread wheels 10. Each of these wheels carries a casing 11$^a$ containing pawls 11$^b$ controlled by springs 11$^c$ and pivotally mounted upon pins 11$^d$. The arrangement is such that backward rotation of the wheels 10 cannot affect the tubular shaft 11, whereas forward rotation of the wheels will bring the pawls 11$^b$ into play instantly and cause the tubular shaft 11 to turn.

Mounted rigidly upon the main shaft 11 are two bevel gears 12, 13 which mesh with other bevel gears 14, 15. The latter communicate rotary motion to the main driving sprocket wheels 16, 17. Mounted rigidly upon the tubular supports 9 are bearing brackets 17$^a$, and journaled to these and depending from them are links 18. The lower ends 19 of these links are secured rigidly to carriages 20. Knives 21, 22, each having the form of an arcuate spiral, are mounted upon spokes 23, 24 which radiate from stub shafts 25, 26, the latter being revoluble.

The carriages 20 are provided with caster forks 27 having rollers 28 which run directly upon the ground, so as to support the carriages. Gear wheels 29, 30 are mounted rigidly upon the stub shafts 25, 26 and mesh with gears 31, 32. Sprocket chains 33, 34 cause rotation of the mutilated gears 31, the sprocket chains being driven by the sprocket wheels 16, 17.

Idle rollers 35, 36 are mounted upon swinging arms 37, 38 carried by the carriages 20. These arms 37, 38 are mounted upon revoluble stub shafts 39, 40, and are connected with springs 41, 42 for pressing the idle rollers against the sprocket chains. This is for the purpose of taking up wear in the sprocket chains, and of maintaining the pressure of the chains substantially equal at all times.

Brackets 43 are mounted upon the tubular supports 9 and upon the rear of these brackets are mounted pulleys 44. Hand levers 45 are journaled upon the tubular supports 9 and from each hand lever 45 a rope 46 passes over a pulley 44 and down to the carriage 20. By tilting the hand levers at will either or both of the carriages 20 may be raised. This arrangement is useful for lifting the carriages over obstructions.

The operation of my device is as follows: Animals such as horses are properly harnessed and used to drag the machine along. The driver takes his seat, and by guiding the animals causes the machine to follow a prescribed course through a field or garden. The rotation of the tread wheels 10 transmits motion through the pawls above described and causes rotation of the stub shafts 25, 26 and the spiral knives connected therewith. The work of these knives is to block the vegetables, such, for instance, as beets.

It will be noted that the mutilated gears 31, 32 act intermittently upon the gears 29, 30 and this causes the rotation of the knives to take place at definite intervals, as the device is dragged along. This is for the purpose of blocking the vegetables, the idea being that the knives first revolve, then skip without cutting, and revolve again.

When the driver wishes to turn the machine around, as for instance, when he reaches one edge of the field or garden, the arrangement of the parts is such (see Fig. 4) that the tread wheels may turn backward or forward independently of each other, yet the tubular shaft 11 can never rotate backward. Whenever the driver wishes to raise either of the carriages he simply moves the adjacent hand-lever and thereafter allows the weight of the carriage to restore it to the ground, and also to retract the lever.

It will be noted that the machine has a comparatively high degree of mobility. The carriages naturally rock or careen independently of each other, so as to conform to the surface of the ground over which they are dragged, and in doing this the knives are not disturbed.

Having thus described my invention, I claim as new and desire to secure by Letters Patent:

1. The combination of a frame provided with a tubular support, a shaft mounted within said frame, tread wheels connected with said shaft for turning the same, carriages disposed adjacent to said tubular support, each carriage being provided with a plurality of rollers whereby it is supported, pivotal connections from said carriage to said tubular support, so as to allow said carriage to move independently of said tubular support, a revoluble shaft mounted upon said carriage, cutters mounted upon said revoluble shaft, and mechanism controllable by rotation of said shaft for turning said revoluble cutters.

2. The combination of a tubular support, tread wheels connected therewith and adapted to turn as the machine is dragged along, gearing connected with said shaft, carriages secured to said tubular support and movable independently of each other, said carriages being provided with wheels whereby they are supported directly upon the ground, revoluble cutters mounted within said carriages, and gearing connected with said revoluble cutters for actuating the same, said gearing being connected with said shaft and receiving its motion therefrom.

3. The combination of tread wheels for engaging the ground, a frame connected with said tread wheels and carried thereby, a carriage pivotally connected with said frame, said carriage being provided with its own wheels, revoluble cutters mounted within said carriage, and gearing for turning said cutters, said gearing including a mutilated gear for rendering the motion of said cutters intermittent.

In testimony whereof I have signed my name to this specification in the presence of two subscribing witnesses.

LEWIS FAY HAYNES.

Witnesses:
FRANK A. GREENFELDER,
W. M. MEYER.